June 22, 1965  W. O. GALONSKA  3,189,964
SLIDE FASTENER STRINGER
Filed July 7, 1961  6 Sheets-Sheet 2

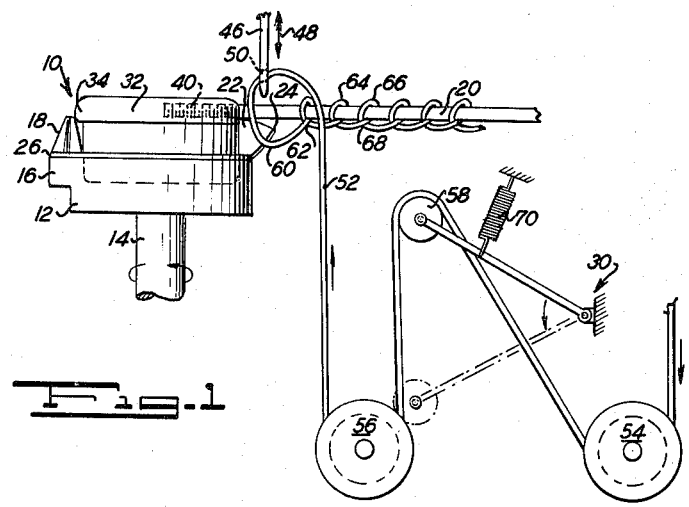
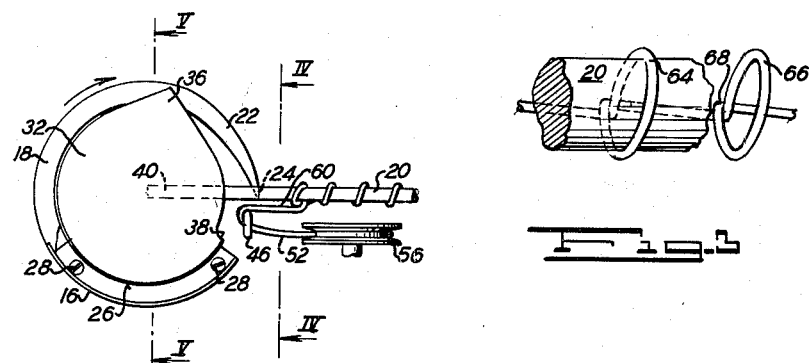
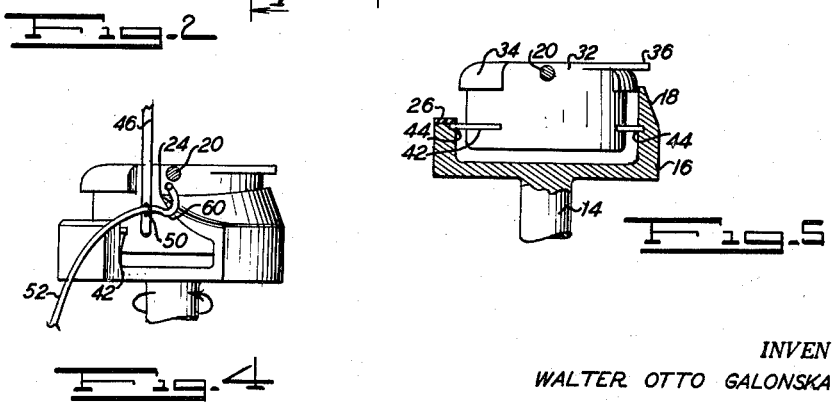
INVENTOR.
WALTER OTTO GALONSKA

INVENTOR.
WALTER OTTO GALONSKA

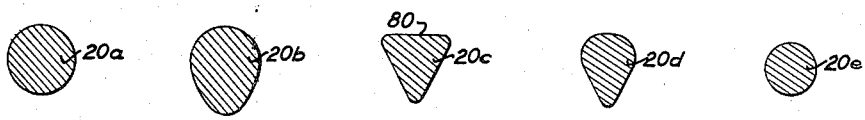
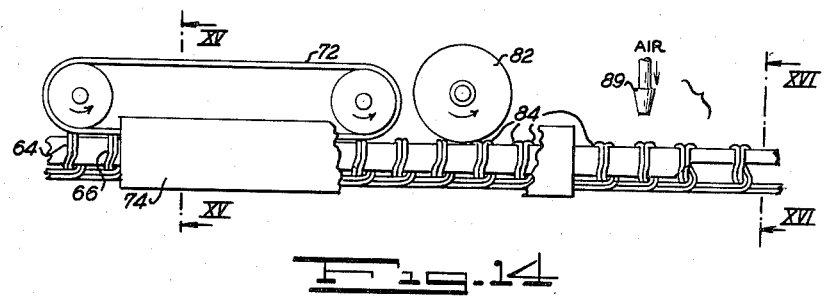
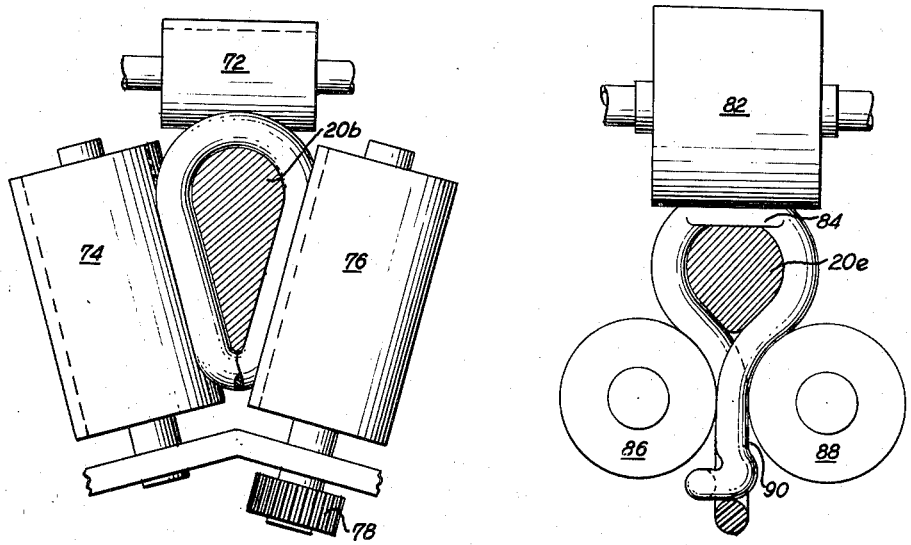
INVENTOR.
WALTER OTTO GALONSKA

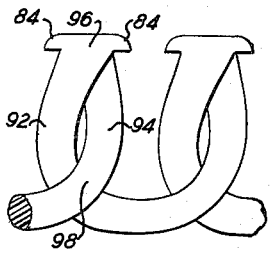
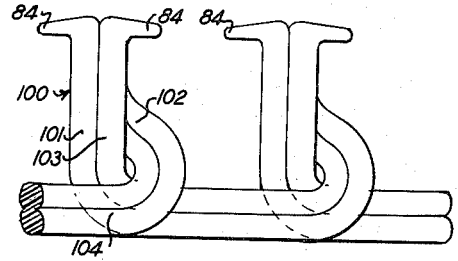
Fig. 17   Fig. 18
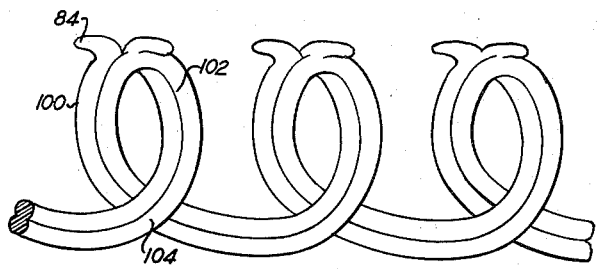
Fig. 19
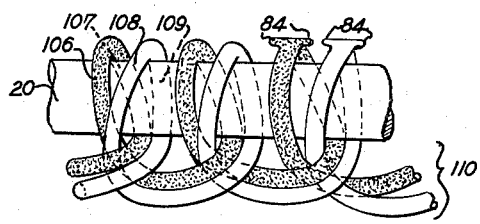
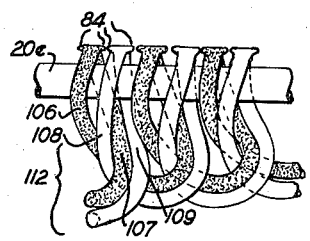
Fig. 22   Fig. 23
INVENTOR.
WALTER OTTO GALONSKA June 22, 1965  W. O. GALONSKA  3,189,964
SLIDE FASTENER STRINGER
Filed July 7, 1961  6 Sheets-Sheet 5
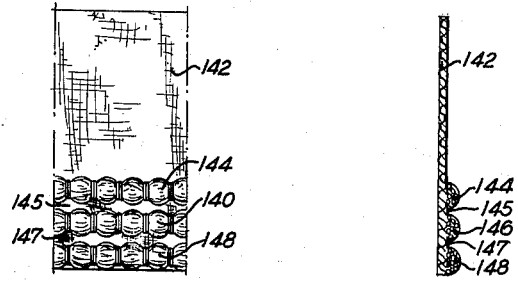
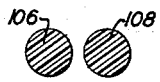   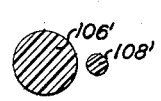
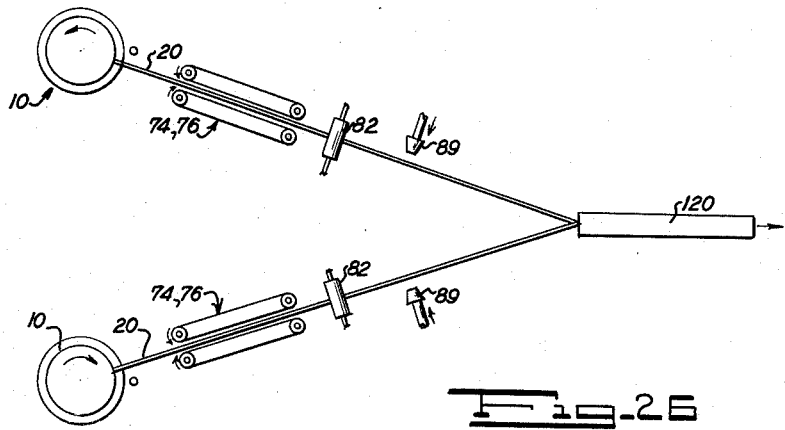
INVENTOR.
WALTER OTTO GALONSKA

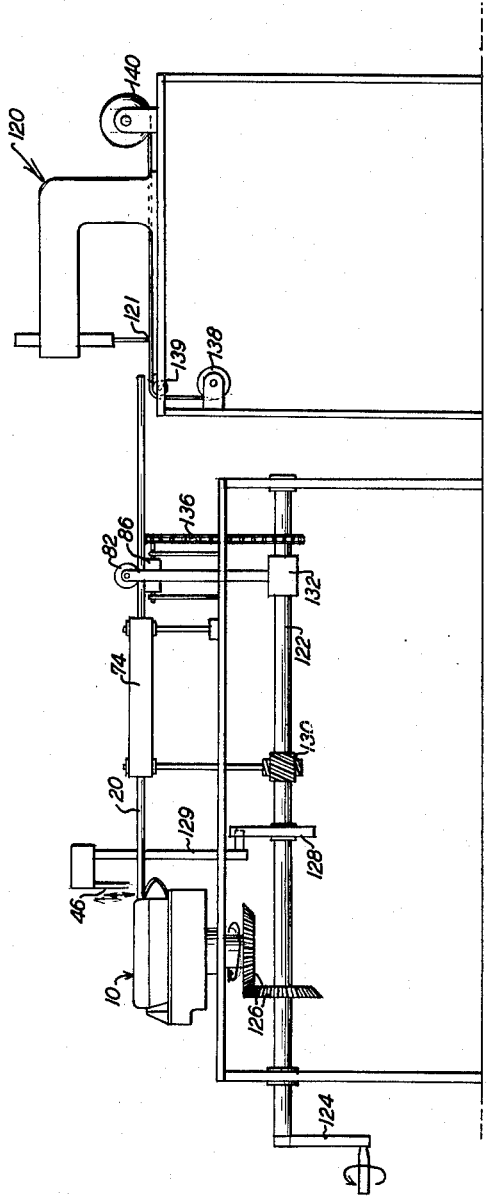

United States Patent Office 3,189,964
Patented June 22, 1965

---

3,189,964
SLIDE FASTENER STRINGER
Walter Otto Galonska, Frankfurt am Main, Germany, assignor to Talon, Inc., Meadville, Pa.
Filed July 7, 1961, Ser. No. 122,512
9 Claims. (Cl. 24—205.13)

The present invention relates to slide fastener stringers and method of making the same from filamentary material.

In the manufacture of slide fasteners, it is known to produce stringer elements by continuously looping a filamentary material into helical coil form, crushing the successive coils along a generatrix to form lugs on the coils and crushing the coils from opposite sides into successive flat loops joining the lugs. In this known method it is necessary carefully to control the pitch of the helical coil in order to obtain the desired spacing between successive adjacent elements of a stringer.

According to the present invention, the successive elements of a stringer are formed by casting from a filamentary material a row of concatenated loops, as in knitting, whereby each loop completes a circle before passing on to the next, with the material crossing over itself as each circle is completed. The spacing between successive adjacent loops is automatically determined by controlling the tension applied to the supply of filamentary material. Furthermore, the points at which the material crosses over itself provide secure stitching points for attaching the stringer of elements to a tape.

A device for carrying out the invention comprises a rotary stitch looper or catcher of a conventional sewing machine, a mandrel onto which successive loops of material are cast, and a reciprocating thread guide or needle for drawing material from a supply and inserting a loop into the catcher in the direction toward the mandrel. As the catcher rotates, it catches a loop of the material already connected to the mandrel at one end and supported by the reciprocating needle at the other end and casts it over the needle supported end of the strand onto the mandrel. Traction is then applied to the supply end of the loop to tighten it onto the mandrel and to position it at a predetermined distance from the last preceding loop on the mandrel. Conveyor means are provided for advancing the loops along the mandrel away from the looper to a station where the loops are heated to destroy their natural resilience, shaped by pressure to form lugs and to flatten a portion of their cross-section, then cooled to restore their resilience. Finally, the formed stringer is delivered to a sewing machine for attaching to a tape or the like.

Two such devices operating in parallel can deliver the two stringers of a slide fastener to a dual sewing machine for simultaneously attaching both stringers to their respective tapes, with the lugs of both stringers mutually inter-digitated.

With the known stringer elements formed from a succession of helical coils, the margin provided by flattening a portion of the cross-section of the coils consists of a series of U-shaped members connected to each other at the ends of their legs where the locking lugs of the fastener elements are positioned. These U-shaped members serve for attaching the stringer to a tape by stitching over the legs and connecting bows and through the tape. The stitching operation must be carefully controlled and it frequently happens that a stitch is made between the legs of adjacent members without actually securing either of them to the tape.

In the stringer according to the present invention, which is equivalent to the first row of knitting stitches cast onto a needle and wherein the successive loops constitute a concatenated series, the margin provided by flatening a portion of the cross-section of the loops consists of a network of intersecting U-shaped members, whereby a stitch made between the legs of adjacent members unavoidably straddles a mesh of the network, thereby providing a more secure attachment to the tape. Furthermore, the heating and flattening step applied to the margin bonds to each other the intersecting legs of adjacent U-shaped members, thereby imparting considerable longitudinal stability to the stringer and preventing spreading of successive elements in response to traction applied to the completed slide fastener. Thus the two stringers of the closed fastener are more securely interlocked than heretofore.

Moreover, the concatenated configuration of successive loops makes it possible to use compound filamentary material, such as two separate threads of same or different cross-section, with improved interlocking properties without impairing the uniformity of the periodical repetition of elements. For example, when two threads of same diameter are used in parallel, it requires only half as many casting on operations for a same number of stringer elements, since each cast forms two elements, and the working time can be reduced in proportion without impairing the secure attaching of all elements to the tape. Any U-shaped member which has been insecurely stitched is in any event secured by the concatenation of each of its legs.

The term "concatenation" as used herein is defined to mean that portion of a continuous length of filamentary material deformed and partially intertwined about itself and having an axis, which is substantially vertical to the normal continuous length of the filamentary material. The "concatenations" occur at spaced-apart intervals to provide a series of substantially parallel, completely formed, spaced-apart loops which are integrally united together in a series or chain-like fashion. The series of loops formed thereby will be referred to hereinafter as "concatenated loops" and, when viewed endwise, are in substantially axial alignment with each other such that the axis of the intertwined "concatenations" define a median plane which includes and passes through the centers of the axially aligned loops to divide each loop into substantially symmetrical portions.

Thus, the invention includes a novel slide fastener stringer of particular and improved configuration, as well as the method for making the same.

In the accompanying drawings:

FIG. 1 is a side elevation of part of the apparatus for making the improved slide fastener stringer.

FIG. 2 is a plan view of a portion at the left of FIG. 1.

FIG. 3 is an enlarged view of a portion at the right of FIG. 2.

FIG. 4 is an end elevation seen from line IV—IV of FIG. 2.

FIG. 5 is a section on line V—V of FIG. 2.

Figure 6:
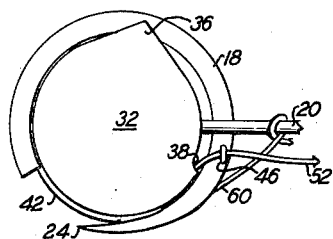
Figure 9:
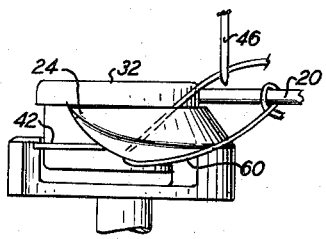
Figure 7:
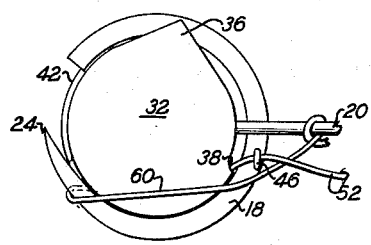
Figure 10:
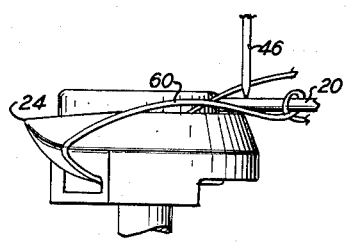
Figure 8:
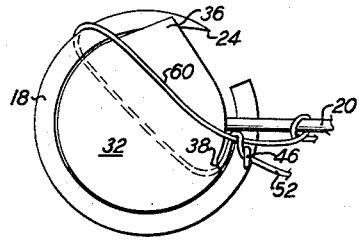
Figure 11:
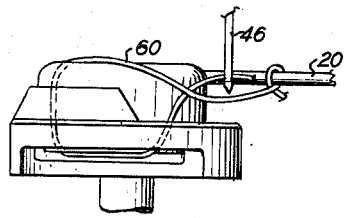

FIGS. 6, 7 and 8 are plan views and FIGS. 9, 10 and 11 corresponding elevations of the same parts as in FIGS. 2 and 4 illustrating the method in different stages.

Figure 12:
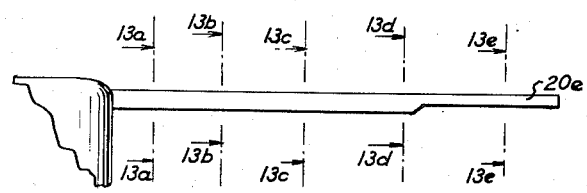

FIG. 12 is a side elevation of an element of the apparatus only fragmentarily shown in the previous figures.

FIGS. 13a to 13e are sections on lines a—a to e—e of FIG. 12.

FIG. 14 is a side elevation with a portion cut away of a further part of the apparatus to the right of FIG. 1.

FIGS. 15 and 16 are enlarged sections on lines XV—XV and XVI—XVI of FIG. 14.

FIGS. 17 and 18 are side elevations of two embodiments of stringer elements in accordance with the invention.

FIG. 19 is a perspective view of the embodiment of FIG. 18 at an intermediate stage of manufacture.

FIGS. 20 and 21 are cross-sections of two types of filament suitable for forming the embodiment of FIGS. 18 and 19.

FIGS. 22 and 23 are side elevations of a further embodiment of stringer elements at two stages of manufacture.

FIGS. 24 and 25 are cross-sections of two types of filaments suitable for forming the embodiment of FIGS. 22 and 23.

FIG. 26 is a plan diagram of a lay-out of a complete apparatus.

FIG. 27 is a side elevation of a complete apparatus.

FIGS. 28 and 29 are a plan and a cross-section of a special tape for attaching thereto the stringers in accordance with the invention.

As seen in FIGS. 1–5, the apparatus includes a looping device indicated generally at 10, a receiving mandrel at 20 and a feeder at 30. The looping device consists of a rotary hood or looper 12 mounted for rotation by a shaft 14. The looper 12 has a base 16 concentric therewith which extends around most of the periphery thereof with an integral upstanding rim 18 of lesser peripheral extent and merging tangentially into a catcher or bail 22 having a tip 24. On the portion of the upper edge of the base 16 not provided with the rim 18 there is provided an annular segment 26 secured by means of screws 28.

Positioned inside the hood 12 is a fixed body member 32 having a domed upper surface curved at the edge 34 to meet closely against the rim 18 and cammed outwardly at 36 over the top of the rim 18. The body member 32 is notched at 38 inwardly of the rim 18.

The body member 32 has secured thereto, such as by screw thread connection 40, a receiving mandrel 20 which extends radially therefrom for some distance, as will be hereinafter described and which retains the body member 32 in fixed position against rotation with the looper 12. The body member 32 is flanged at 42 and the looper 12 is grooved at 44 to receive the flange 42. The annular segment 26 secures the flange 42 in the groove 44. The flange 42 extends around the major portion of the periphery of the body member 32 but is omitted between the cam 36 and the notch 38.

The sides and bottom of the body member 32 are spaced from the inside of the looper base 16 and rim 18, except at the edge 34, by a clearance sufficient to allow passage of the maximum size of filamentary material to be worked in the device.

Alongside of the looper 12 and closely adjacent to the mandrel 20, there is mounted a needle or filament guide 46 which reciprocates in the direction of the arrows 48 directly into and out of the path of rotary movement of the bail 22. The needle 46 has an eye 50 through which is threaded a filament 52. The filament 52 is supplied to the needle 46 from a supply not shown over braking guide pulleys 54 and 56 and a tensioning means 58. As viewed in FIG. 1 the needle 46 has already completed its upward movement, leaving behind it a loop 60 caught on the bail 22, whereas in FIGS. 2 and 4 the needle is at its low point where the loop 60 is slightly below the tip 24 of the bail 22. It is important to note that the needle 46 lays the loop 60 in the bail 22 from below on its upward stroke.

Turning now to FIGS. 6–11, it will be seen that the loop 60 is carried by the bail 22 of the rotating looper 12 around and over the top of the body member 32. At the same time the filament 52 is held against the notch 38 while the loop 60 is thrown over the supply filament 52. As the looper 12 continues to rotate, the loop 60 is cast off by the cam 36 while its underside passes through the clearance between the body members 32 and the inside of the looper 12. Thus the loop 60 finally ends up as a conventional knitter's first stitch cast onto the mandrel 20, whereupon the tensioning means 58 exerts a pull on the supply filament 52 and draws the stitch to closed configuration. Successive rotations of the looper 12 with successive reciprocations of the needle 46 cast on a series of stitches as shown in FIGS. 1–3 and 6–11.

FIG. 3 clearly shows how the stitches are all in the form of concatenated loops 62, 64, 66 etc. each having a crossed-over formation 68 at the point where the cast loop crosses over the supply filament in course of formation. For clarity of illustration, the successive loops or stitches on the mandrel 20 are shown with exaggerated inter-spaces, but in practice they will be placed in close proximity to each other, as determined by the configuration of the slide fastener stringer to be made therefrom. This spacing can be varied, if desired, by adjusting the tension exerted by the spring 70 of the tensioning means 58.

Proceeding now toward the right of what is shown in FIG. 1, it will be seen from FIGS. 12 and 13a to 13e that the mandrel 20 has progressively varying cross-sections 20a to 20e. Between the cross-sections 20a and 20d, the successive completed concatenated loops acquire gradually different shapes. From cross-section 20a to cross-section 20c, the succession of loops passes through a conveyor station illustrated in FIGS. 14 and 15 comprising conveyor belts 72, 74 and 76, driven for example by gear 78. This conveyor station causes the succession of loops to advance to the right along the mandrel 20 at a regular pace timed in synchronism with the looper 12 and the needle 46. At the same time, if the filamentary material is of thermoplastic nature, the conveyor station serves as a heating station for destroying the natural resilience of the material. For this purpose, heating elements may be incorporated in the conveyor belts or combined therewith. When the successive loops issue from the conveyor and heating station and move on to cross-section 20c of the mandrel 20, they are in softened condition and conform closely to the configuration of the mandrel 20. They then pass over the section 20c, at which the mandrel 20 has a flat upper surface 80, and under a flattening roller 82 which crushes them slightly and spreads the material lengthwise of the mandrel 20 to form locking means or lugs 84 on each side of each loop extending into the spaces between the loops. In FIG. 14 the loops are shown as having been made from a dual filament, but the procedure is exactly the same for single or compound filaments.

At a convenient point also in relation both to the heating station and to the cross-section of the mandrel, particularly at the smallest cross-section 20e, the lower, concatenated portion of the loops passes between two squeeze rollers 86 and 88, shown in FIG. 16, for flattening this portion of each loop transversely into the median plane thereof to form a margin for the stringer at 90. As the loops issue to the right from the rollers 82, 86 and 88 they are cooled by a jet of air from nozzle 89.

FIGURES 17 to 25 illustrate in detail several forms of loops which may be made in accordance with the invention for use as stringer elements.

In FIG. 17 which illustrates a pair of monofilament elements as shown in FIGS. 1 to 11, each element is made up of a proximal leg 92, a remote leg 94, a bend 96 joining the two legs, and a concatenation or intersection 98 at which the remote leg crosses forwardly over the proximal leg. The band 96 is provided with locking means or lugs 84. The lugs of a mirror reflection element, interdigitated between the two elements shown, will lock the two stringers together in the closed condition of the slide fastener.

FIGS. 18 and 19a illustrate similarly elements made from a double filament, with legs 100 and 102 and concatenation 104. FIG. 19 is a developed perspective of FIG. 18. FIGS. 20 and 21 illustrate cross sections of a double filament which may be used in accordance with the present invention. The double filament has two integral filaments 101 and 103 or 101' and 103' with a web 105 therebetween.

FIGS. 22 to 25 illustrate elements made from two separate filaments fed simultaneously from separate supplies through a same needle 46 and cast simultaneously onto the mandrel 20. The filaments 106 and 108 have been shown in different colors for visual differentiation, but they may be of any color. The first loop at the left has legs 106 and 107 and the next loop legs 108 and 109. The concatenated margin 110 of FIG. 22 is shown compressed at 112 in FIG. 23 to illustrate the substantial width obtained by means of the rollers 86 and 88. It is clear that a margin of this intertwined complexity provides a secure base for sewing the stringer onto a tape. FIG. 25 illustrates the fact that the element configuration of FIGS. 22 and 23 can also be made up from two separate filaments of different thicknesses.

For manufacturing stringers of different sizes, the mandrel 20 can be replaced by others of different thicknesses within the tolerances of different sized filaments capable of passing through the clearance between the looper and the body member. It is for this reason that the mandrel 20 is releasably connected to the body member 32, for example by its threaded tip 40.

In FIG. 26 there is shown diagrammatically in plan view a lay-out of a complete apparatus for manufacturing simultaneously the two interengageable stringers of a slide fastener. Each of two looping devices 10 forms a concatenated series of loops on the associated mandrel 20 for conveying past a heating station 74, 76, a shaping roller 82 and a cooling nozzle 89 to a sewing station 120. On delivery to the sewing station 120 the two stringers are already in interdigitated relationship with the elements of one stringer locked in the spaces between elements of the other. At the sewing station 120 each stringer is sewn onto a stringer tape, for example by two sewing machines operating in unison or by a combination sewing machine with two stitching heads.

FIG. 27 illustrates a complete installation including a looping device 10 with a needle 46, a mandrel 20, a conveying and heating station 74, a shaping station 82, 86 and a sewing station 120. A common drive shaft 122, driven at 124 as by a crank or the like, drives the looping device 10 through gears 126, the needle 46 through an eccentric groove disc 128 and follower 129, the conveyor belt 74 through a worm drive 130, the crushing roller 82 through a transmission 132 and the squeeze rollers 86 through a chain and sprocket 136. At the sewing station 120 stringer tape is fed from a suply 138 over a guide roller 139 to the sewing machine head 121 and thence to a take-up roll 140 for the completed stringer mounted on the tape.

When manufacturing heavy-duty slide fastener stringers from relatively heavy thermoplastic filament, particularly of the type illustrated in FIGS. 22 and 23 with a wide securing margin, it is of special advantage to use the tape illustrated in FIGS. 28 and 29. This tape comprises a web 142 and a plurality of beads 144, 146 and 148. In some instances two such beads may be sufficient, but for very heavy-duty fasteners three beads are preferred, and in the latter case the thermoplastic stringer is secured to the tape with the margin 112 of FIG. 23 overlying the three beads and the lugs 84 at or slightly beyond the free edge of the tape at the bead side thereof. The stitching of the stringer to the tape follows the valleys 145 and 147. The margin or web 142 is then fully available for firmly securing to the underside of the material of the article to which the slide fastener is to be attached, and the edge of said material can safely overlie the stringer of fastener elements.

What is claimed is:

1. A stringer of slide fastener elements comprising a continuous strand of filamentary material defining a geometrically periodical series of spaced concatenated loops, said loops having a common median plane, each loop including two legs with each leg thereof disposed on opposite sides of said plane, a bend lying substantially transverse to said common median plane and joining the two legs of each loop at one end thereof and a concatenation intersecting the legs at the other end thereof, and locking means extending from the bends into the spaces between adjacent loops.

2. A stringer for a slide fastener comprising at least one continuous strand of filamentary material having a median plane, said material deformed and partially intertwined about itself at spaced-apart intervals so as to provide a series of equally spaced-apart loops interconnected at one side thereof by means of a series of longitudinally extending portions, the filamentary material of each of said loops being deformed on the side opposite that from the longitudinally extending portions so as to provide an interlocking bend portion on each of said loops which lies substantially transverse to said median plane whereby a series of interconnected fastener element portions are provided.

3. A stringer for a slide fastener comprising a continuous filamentary material normally extending in a given median plane and which has at least one continuous strand, said filamentary material uniformly deformed at spaced apart intervals and partially intertwined about itself to provide a series of connected spaced-apart loops in longitudinal alignment with each other and with said filamentary material at each interval forming loops from said continuous strand; said loops formed at each interval including a pair of legs and a bend portion lying substantially transverse to said common median plane and which interconnects said pair of legs on the side opposite to that wherein said loop is intertwined; said bend portion of each of said loops deformed to provide an interlocking head portion whereby a series of interconnected fastener element portions are provided.

4. A stringer for a slide fastener according to claim 2 wherein said filamentary material comprises at least two continuous strands of filamentary material.

5. A stringer for a slide fastener according to claim 2 wherein said filamentary material comprises two continuous strands lying in side-by-side relationship; said filamentary material uniformly deformed at spaced apart intervals to form from said continuous strands at each interval two independent loops disposed in side-by-side relationship, each loop including a pair of legs and a bend portion which interconnects said pair of legs at the side opposite to that wherein said loop is intertwined; said bend portions of each independent loop deformed in an opposite sense to extend into the space between the loops at adjoining intervals to provide a single interlocking head portion for each loop of said filamentary material.

6. A stringer for a slide fastener according to claim 2 wherein said filamentary material comprises two continuous strands lying in side-by-side relationship, said filamentary material uniformly deformed at spaced apart intervals and partially intertwined about itself to provide a series of connected equally spaced-apart loops in longitudinal alignment with each other and with said filamentary material forming from said pair of continuous strands at each interval two independent loops disposed in spaced relation to each other with the bend portion of each loop separated a distance equal to the distance separating adjoining loops of said equally spaced series of loops formed at the given intervals.

7. A stringer for a slide fastener as in claim 5 wherein said two continuous strands forming said filamentary material are integrally joined together such that said top portions thereof are in longitudinal alignment with each other and with said series of loops.

8. A stringer for a slide fastener as in claim 5 wherein said two continuous strands forming said filamentary material includes an integrally formed web located therebetween which spaces said strands from each other and maintains said top portions in longitudial alignment with each other and with said series of loops.

9. A stringer for a slide fastener comprising a continuous strand of filamentary material normally extending in a given longitudinal direction and uniformly deformed at spaced apart intervals therealong and partially intertwined about itself to form a series of loops in longitudinal alignment with each other and with each loop formed thereby interconnected by said longitudinally extending filamentary material to the next successive loop, said loops formed at each interval including a pair of curved legs and a top portion extending in a direction substantially transverse to the given longitudinal direction of said filamentary material and interconnecting said pair of legs on the side opposite to that wherein said loop is intertwined, opposite sides of each of said top portions of said filamentary material deformed to extend into the space between adjacent loops in a direction substantially parallel to the given longitudinal direction of said filamentary material to provide a single interlocking head portion on each loop whereby a series of interconnected fastener element portions are provided.

References Cited by the Examiner
UNITED STATES PATENTS

| | | | |
|---|---|---|---|
| 1,557,304 | 10/25 | Marinsky. | |
| 2,068,359 | 1/37 | Sundback | 24—205.16 |
| 2,541,728 | 2/51 | Wahl | 18—5 |
| 2,651,092 | 9/53 | Poux | 24—205.16 |
| 2,907,066 | 10/59 | Wahl | 18—1 |
| 2,919,482 | 1/60 | Casson | 24—205.13 |
| 2,939,192 | 6/60 | Hansen | 24—205.13 |
| 3,027,618 | 4/62 | Galonska | 24—205.13 |

FOREIGN PATENTS

| | | |
|---|---|---|
| 210,347 | 3/56 | Australia. |
| 850,409 | 12/39 | France. |
| 1,248,598 | 11/60 | France. |
| 1,054,394 | 4/59 | Germany. |
| 559,663 | 2/44 | Great Britain. |
| 874,619 | 8/61 | Great Britain. |

M. HENSON WOOD, Jr., *Primary Examiner.*

ABRAHAM STONE, DONLEY J. STOCKING,
*Examiners.*